United States Patent
Carter et al.

[15] 3,683,988
[45] Aug. 15, 1972

[54] POSITIVE LOCK STRUCTURAL FASTENER

[72] Inventors: George D. Carter, Fort Worth; Cecil E. Covington, Hurst; Ernst C. Schellhase, Fort Worth, all of Tex.

[73] Assignee: Textron Inc., Providence, R.I.

[22] Filed: March 3, 1970

[21] Appl. No.: 16,111

[52] U.S. Cl. ........................................151/6, 151/69
[51] Int. Cl. ................................................F16b 39/02
[58] Field of Search....................151/6, 69, 68, 69.70

[56] References Cited

UNITED STATES PATENTS

| | | |
|---|---|---|
| 2,929,474 | 3/1960 | Boardman..................151/69 |
| 2,992,685 | 7/1961 | Madsen........................151/69 |
| 3,415,302 | 12/1968 | Beck.............................151/69 |
| 3,124,190 | 3/1964 | Cornell.........................151/69 |
| 2,390,173 | 12/1945 | Richey............................151/6 |
| 2,921,616 | 1/1960 | Threewit et al..............151/69 |
| 3,390,712 | 7/1968 | McKay.........................151/69 |

FOREIGN PATENTS OR APPLICATIONS

| | | | |
|---|---|---|---|
| 828,194 | 2/1960 | Great Britain...............151/69 |
| 559,145 | 2/1944 | Great Britain.................151/6 |

Primary Examiner—Edward C. Allen
Attorney—Richards, Harris & Hubbard

[57] ABSTRACT

A fastener secures an outer panel having a threaded hole therein to an inner panel by a retainer member on the inner side of the inner panel having a slotted inner end and a channel therethrough. A bolt in the channel has a first threaded outer end portion for engaging the threaded hole in the outer panel, a shoulder facing the inner surface of the inner panel, and a slotted inner end. The bolt extends through a hole in the inner panel. A latch captured in the slotted inner end of the bolt extends through the bolt and engages the slotted inner end of the retainer member to prevent rotation of the bolt.

6 Claims, 9 Drawing Figures

PATENTED AUG 15 1972     3,683,988

INVENTORS:
GEORGE D. CARTER
CECIL E. COVINGTON
ERNST C. SCHELLHASE

Richards, Harris & Hubbard
ATTORNEYS 3,683,988

POSITIVE LOCK STRUCTURAL FASTENER

BACKGROUND OF THE INVENTION

This invention relates to fasteners and more particularly to threaded fasteners which can be positively but disengagably locked to prevent rotation after the fastener has secured two members together.

A variety of fasteners are available in the prior art. These fasteners fulfill an equal variety of needs and purposes. In the prior art two types of nuts are shown which can be utilized to fasten two surfaces together. One of these fastening nuts requires a specially shaped inner panel while the second nut requires a recessed channel in the second panel. In addition, neither of these fasteners has a provision for or is adaptable to locking a bolt or screw in position once inserted and secured in the nut. Other fasteners disclosed in the prior art are of the quick-operating two panel connecting type. However, each of the fasteners disclosed therein has the bulk of the device located on and projecting from the outer panel whereas for many applications it is desirable to mount the bulk of the device on an interior panel. Other fasteners disclosed by the prior art are of the floating receptacle type.

None of the fasteners disclosed above possess certain desirable attributes. In certain applications it is desirable to mount the bulk of a structural fastener toward the interior of a structure being connected. However, at the same time it becomes necessary to be able to remove or disconnect the fastener from the exterior of the structure. In addition, it may be desirable to mount a fastener such that the exterior surface thereof is flush with the exterior surface of the structure being fastened or connected. In addition, many structures are subject to vibrations and other outside influences which can cause ordinary threaded fasteners to eventually loosen and disengage. Therefore, it is desirable to possess a threaded fastener which can be positively and simply locked in position to prevent rotation when the fastener is engaging and securing together two panels. When a fastener is disengaged, it can also be desirable to cause it to retract into the interior of the structure being fastened to facilitate maintenance and increase safety.

SUMMARY OF THE INVENTION

The present invention therefore provides a fastener for securing an outer panel to an inner panel comprising a retainer member mounted on the inner side of the inner panel and having a slotted inner end and a channel therein communicating with a limited internally threaded portion which is coaxial with the nut and an opening in the inner panel, a bolt mounted in the channel having a first threaded outer end portion for engaging a threaded hole in the outer panel, a second threaded portion engaging the limited internally threaded portion of the retainer member, a shoulder intermediate the first and second threaded portions facing the inner surface of the inner panel and a slotted inner end, a latch means for engaging the slotted inner end of the retainer member and a slotted inner end of the bolt to prevent rotation thereof.

BRIEF DESCRIPTION OF THE DRAWINGS

A better understanding of the invention can be derived by reference to the ensuing specification and the appended drawings wherein.

DESCRIPTION OF PREFERRED EMBODIMENTS

Figure 1:
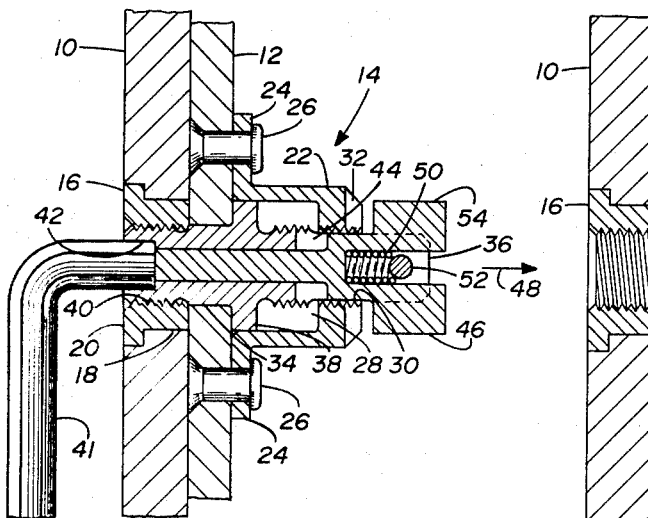
FIG. 1 is a cross sectional view of the fastener of the present invention in an unlocked and engaged position.

Referring now to FIG. 1 wherein a fastener of the present invention is shown securing an outer panel 10 to an inner panel 12. As can be seen, the fastener is in an engaged but unlocked position. An example of the use of such a fastener is to secure a cowling, in this instance shown as outer panel 10, to a fixed structure or engine frame, in this instance shown as inner panel 12. The fastener generally designated 14 provides a smooth outer surface and at the same time positively secures outer panel 10 to inner panel 12. The smooth outer surface is provided by recessing a nut 16 in an appropriately sized opening in outer panel 10. The nut can be secured to outer panel 10 by a mechanical bond for example a serrated peripheral portion 18 press fitted into the opening in outer panel 10, or by providing a hexagonal head 20 on the nut 16 fitted into a corresponding recess in the outer panel. If desired, the nut can be entirely eliminated by drilling and internally threading a hole in the outer panel. The interior portion of the fastener 14 includes a retainer member or cylinder 22. The cylinder 22 includes a flanged portion 24 which abuts the inner surface of panel 12 and is secured thereto by rivets 26 or other suitable fastening means. To provide intimate contact between the outer surface of inner panel 12 and the inner surface of outer panel 10, the heads of the rivets 26 are recessed into the outer surface of inner panel 12. The retainer member has a channel 28 therein, preferably of cylindrical shape, which narrows to an end portion 30 of lesser diameter at its inner end. The inner end 30 of the retainer member is internally threaded. The inner end of the retainer member contains a plurality of radial slots 32 which can better be seen in FIG. 4.

The internally threaded portion 30 of the retainer member 22 is coaxial with an opening 34 in the inner panel and is coaxial with the internally threaded portion of nut 16. The opening 34 in the inner panel 12 has a lesser diameter than the cylindrically shaped channel 28 in the retainer member 22. Mounted within the channel 28 is a bolt member 36 having a shoulder 38 thereon which engages the inner surface of inner panel 12 when the externally threaded outer portion 40 of the bolt engages the internal threads of nut 16, thus securing inner panel 12 against outer panel 10. The outer end of the bolt 36 has a recessed engagement portion 42, for example an Allen socket or a screw driver slot into which an appropriate tool, such as Allen wrench 41, can be inserted for threading the bolt into nut 16 and for retracting the bolt as will be described hereinafter. A coaxial hole or channel is provided through the bolt 36. The inner end of the bolt also contains a longitudinal and diametric slot 44 which runs from the inner end of the bolt 36 through at least part of its length toward the outer end of the bolt. Positioned in the coaxial bolt hole and in the slot 44 is a latch member 46. An arm of the latch member 46 extends through the coaxial bolt hole into the recessed engagement portion 42. When an appropriate tool is inserted into the recessed engagement portion, the latch member 46 is moved in the direction of arrow 48 since the arm of the latch member 46 is pushed out of the recess 42 by the force of the tool. The latch member 46, however, is biased in the direction opposite to arrow 48 by a spring 50 engaging the latch member 46 and retained by pin 52 mounted in the inner end of bolt 36 transverse to the longitudinal slot 44. When the latch member 46 is in its biased position, that is the position in which it would be if no tool were inserted in engagement recess 42, the flanges 54 of the latch member 46 will engage the radial slots 32 of the retainer member and thus coacting with the longitudinal slot 44 will prevent rotation of bolt 36. Hence, bolt 36 secures inner panel 12 to outer panel 10 through the engagement of threaded portion 40 and nut 16 and is securely locked by the engagement of latch member 46 in radial slots 32 of retainer member 22.

Figure 2:
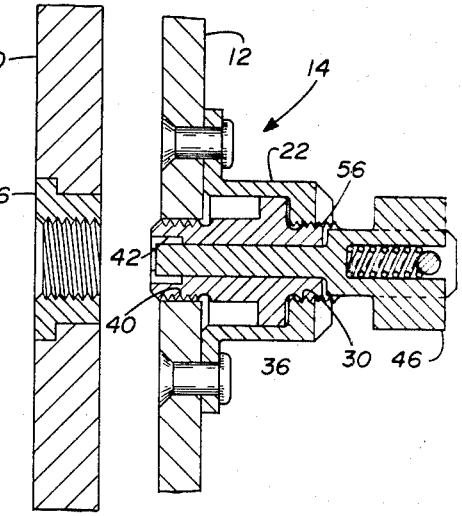
FIG. 2 is a cross sectional view of the fastener of the present invention in a disengaged and retracted position.

Referring now to FIG. 2, the latch mechanism 14 is illustrated as disengaged from the nut 16 in the outer panel 10. As can be seen the latch member 46 is in its biased position and has its arm extending through the coaxial hole of the bolt into the recessed engagement portion 42 at the outer end of the bolt 36. In addition, the bolt has been retracted into the retainer member 22 so that the outer end of the bolt is flush with the outer surface of inner panel 12. This is accomplished by the engagement of internally threaded portion 30 with the threaded portion 56 of the bolt 36. As can be seen, the threaded portion 56 runs only a short distance from the shoulder 38 of the bolt toward the inner end of the bolt. Thus, when the bolt is screwed out to again engage nut 16, the threaded portion 56 will disengage from the threaded portion 30 to allow free engagement of the threaded outer end 40 of the bolt with the nut 16.

Figure 3:
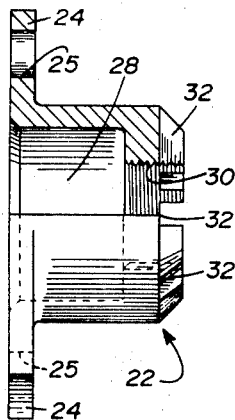
FIG. 3 is a partial cross sectional side view of the retainer member.
Figure 4:
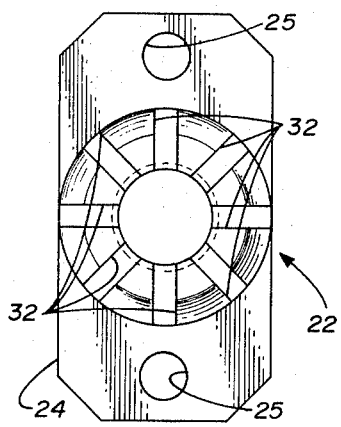
FIG. 4 is a view of the inner end of the retainer member.
Figure 7:
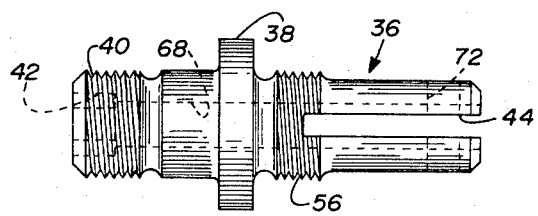
FIG. 7 is a side view of the bolt.

With reference to FIGS. 3 and 4, like numbers will be utilized where possible. FIG. 3 illustrates the retainer member partially in cross section and partially a side view. The retainer member 22 is shown with flanges 24 containing holes 25 through which it is attached by rivets or other suitable fasteners to the inner surface of an interior panel. The cylindrical chamber or channel 28 narrows to an internally threaded intermediate portion (shown as 56 in FIG. 7) of the bolt. The slots 32 provided on the inner end of the retainer member 22 can better be seen in FIG. 4. The slots 32 are radial and are circumferentially spaced about the inner end of the retainer member 22. The slots 32 are sufficiently wide to receive and engage the flanges on the latch member. Of course, any number of slots can be provided within the limitation of space available on the end of the retainer member. It has been found that six slots positioned as shown is adequate for most purposes for which the present fastener is utilized.

Figure 5:
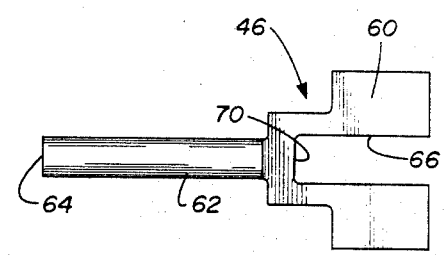
FIG. 5 is a side view of the latch member of the present invention.

FIG. 5 is a side view of the latch member 46 shown in FIGS. 1 and 2. The latch member includes a flat or planar portion 60 which fits into the slot provided at the inner end of the bolt. The flat portion 60 is integrally connected to a cylindrically shaped arm 62 which is slidably positioned in the coaxial hole in the bolt. The end 62 of the arm extends into the recessed engagement portion at the outer end of the bolt and is engageable by a tool which is inserted into the engagement recess at the outer end of the bolt. A slot 66 is provided in the flat portion 60 to accommodate the biasing spring (shown as 44 in FIGS. 1 and 2).

Referring now to FIGS. 6 through 9, FIG. 7 is an enlarged drawing of the bolt 36 shown rotated 90° from the view in FIG. 1. The outer end of the bolt is provided with an engagement recess 42. A coaxial hole 68 runs the length of the bolt and is provided for insertion of the arm 62 of the latch member 46. Slot 44 is provided to receive the planar portion 60 of the latch member 46. After the latch member has been positioned in the bolt 36, a coil spring of appropriate size is inserted into channel 68 from the inner end of the bolt. The coil spring at one end abuts against surface 70 (FIG. 5) of the latch member and at its other end is retained by a pin (not shown) which is thereafter inserted in holes 72 at the inner end of the bolt 36. This hole is preferably positioned transverse to the slot 44 to provide proper retention of the coil spring and to provide strength.

Figure 6:
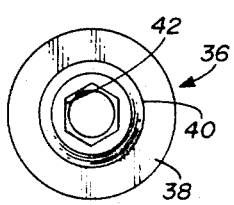
FIG. 6 is a view of the outer end of the bolt forming a portion of the fastener.
Figure 8:
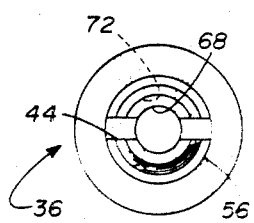
FIG. 8 is a view of the inner end of the bolt of FIG. 7.
Figure 9:
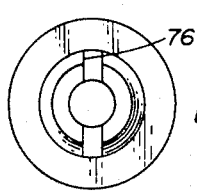
FIG. 9 is a view of an alternative outer end of the bolt of the present invention.

FIG. 6 is an end view of the outer portion or end of the bolt 36 showing the hexagonal Allen type engagement recess 42. The exterior threaded portion 40 and the shoulder 38 for engagement with the inner surface of inner panel 12. FIG. 8 is an end view of the inner end of the bolt 36 showing the threaded portion 56 which engages the internal threads of the retainer member 22, the diametric longitudinal slot 44, channel 68, and hole 72 transverse to the slot 44. FIG. 9 shows an alternative embodiment for the outer end of the bolt to be utilized with the present invention. In this embodiment the bolt, instead of being supplied with a hexagonal Allen type engagement recess, is provided with a diametric slot 76 which runs longitudinally from the outer end of the bolt to approximately the same depth as would a hexagonal engagement recess. Thus, a screw driver can be used to turn the bolt and engage the arm 62 of the latch member 46.

As will be apparent upon a reading of the foregoing specification, many and diverse alterations and variations of the present invention can be made without departing from its concept. The invention disclosed herein is intended to be limited only by the definition contained within the appended claims.

What is claimed is:

1. A fastener for securing an outer panel to an inner panel comprising:

a. a retainer member mounted on the inner side of said inner panel and having a slotted inner end and a channel therein with a limited internally threaded portion near said inner end of said retainer member, b. a bolt mounted in said channel having a first threaded outer end portion for engaging an aperture in said outer panel and a second threaded portion engaging said limited internally threaded portion of said retainer member, at least the outer portion of said aperture being internally threaded to engage said first threaded outer end portion, a shoulder intermediate said first and second threaded portions facing said inner side of said inner panel, and a slotted inner end, said bolt extending through a smooth hole in said inner panel, the bolt having a shank portion between said threaded outer end portion and said shoulder for slidably engaging the perimeter of said hole in said inner panel, and c. a latch means for positively engaging said slotted inner end of said retainer member and said slotted inner end of said bolt to prevent rotation thereof.

2. The fastener of claim 1 wherein said slotted inner end of said bolt comprises a longitudinal and diametric slot, said slotted inner end of said retainer member comprises a plurality of radial slots, said latch means slidably mounted in the longitudinal slot and including means for biasing said latch means into engagement with at least one of said radial slots.

3. The fastener of claim 2 wherein said bolt further comprises recessed engagement means at its outer end for engaging a driven member and a channel running the length thereof.

4. The fastener of claim 3 wherein the driven member comprises a bar member slidably mounted in said channel in said bolt and extending from within said engagement means to said latch means, said bar member connected to said latch means.

5. The fastener of claim 4 wherein a retaining member is mounted at the inner end of said bolt transverse to said diametric slot and wherein a spring means is mounted in said diametric slot and retained by said retaining member for biasing said latch means into engagement with said radial slots.

6. The fastener of claim 5 wherein said first threaded outer portion of said bolt engages an internally threaded nut secured in said outer panel and mounted flush with said outer surface of said outer panel.

* * * * *